April 21, 1970     H. J. BALDWIN     3,507,177
APPARATUS FOR SHARPENING RECIPROCATING CUTTING BLADE
OF MATERIAL CUTTING MACHINE
Filed May 6, 1968     4 Sheets-Sheet 4

United States Patent Office 3,507,177
Patented Apr. 21, 1970

3,507,177
APPARATUS FOR SHARPENING RECIPROCATING CUTTING BLADE OF MATERIAL CUTTING MACHINE
Herman J. Baldwin, Cincinnati, Ohio, assignor to The Cincinnati Milling Machine Co., Cincinnati, Ohio, a corporation of Ohio
Filed May 6, 1968, Ser. No. 726,697
Int. Cl. B26d 7/12
U.S. Cl. 83—174                        15 Claims

ABSTRACT OF THE DISCLOSURE

A material cutting machine has means to sharpen a rotatably mounted reciprocating knife. The sharpening means comprises two grinding wheels, which are normally held in spaced relation to the knife when the knife is rotated by being rotated therewith. When the knife is to be sharpened, one of the grinding wheels is moved into engagement with the knife during removal of the knife from cutting engagement with the material and the other of the grinding wheels is moved into engagement with the other side of the knife when the knife is returned into cutting engagement with the material.

---

In material cutting machines of the type shown and described in the copending patent application of Edward C. Bruns for "Material Cutting Machine Having Reciprocating Cutting Blade With Two Axes of Rotation," Serial No. 726,658, filed May 6, 1968, and assigned to the same assignee as the assignee of the present application, the cutting edge of the reciprocating knife must always be sharp in order that a pattern will be formed in the material being cut. Furthermore, if the cutting edge of the reciprocating knife should become dull, the life of the cutting knife would be substantially reduced.

The present invention satisfactorily solves the foregoing problem by utilizing a knife sharpening apparatus that automatically sharpens the reciprocating knife at predetermined time intervals as programmed in a numerical control apparatus, which controls the material cutting machine of the aforesaid Bruns application. Thus, by utilizing the numerical control apparatus, appropriate programming insures that the knife is maintained sharp while the time for such sharpening is substantially reduced through sharpening the knife during one of the time periods when the reciprocating knife is lifted from cutting engagement with the material being cut to change the heading of the knife by rotating it.

As described in the aforesaid Bruns application, the reciprocating knife has two different axes of rotation with the knife being rotatable about one of the axes of rotation when the knife is lifted from cutting engagement with the material being cut and rotatable about the other of the axes of rotation when the knife is returned into cutting engagement with the material being cut. By appropriately positioning the grinding wheels of the sharpening apparatus of the present invention, sharpening of one side of the knife may occur during lifting of the knife while the other side of the knife is sharpened during return of the knife into cutting engagement with the material being cut. This avoids any down time of the material cutting machine for sharpening the knife.

Since the reciprocating knife of the material cutting machine of the aforesaid Bruns application is rotatable through 360°, the angular relation of each of the grinding wheels of the sharpening apparatus to the heading of the knife must be maintained at all times. This is necessary to insure that each of the grinding wheels maintains its desired relationship with the side of the knife that the grinding wheel is to sharpen.

The present invention satisfactorily meets this problem by mounting the grinding wheels on a support structure that rotates whenever the knife rotates. However, this support structure is rotatable about a single axis of rotation irrespective of the specific axis of rotation of the cutting knife.

Since the material cutting machine of the aforesaid Bruns application must cease operation whenever it is necessary to replace the cutting knife, it is desired that the cutting knife have as long a life as possible while still obtaining satisfactory cutting from the knife. In order to obtain this relatively long life of the cutting knife, it is necessary for the knife to be capable of being sharpened after wear of the knife occurs.

The present invention satisfactorily solves this problem by utilizing a sharpening apparatus in which there is automatic compensation for any wear of the knife. Thus, the grinding wheels of the sharpening apparatus of the present invention are always moved into engagement with the knife irrespective of the amount of wear of the knife that will change the distances between the side of the knife to be sharpened and the grinding wheel to sharpen the knife.

An object of this invention is to provide an apparatus for sharpening a rotatably mounted reciprocating knife in which the same angular relation between the sharpening means and the knife is maintained at all times.

Another object of this invention is to provide a knife sharpening apparatus having means to automatically compensate for wear of the knife.

A further object of this invention is to provide an apparatus for sharpening a reciprocating knife in which the knife is moved vertically while the sharpening means is fixed during sharpening of the knife.

Still another object of this invention is to provide an apparatus for sharpening opposite sides of a reciprocating knife having two axes of rotation.

Other objects of this invention will be readily perceived from the following description, claims, and drawings.

This invention relates to a material cutting machine having a reciprocating knife to cut material and means to remove the knife from engagement with the material being cut. The cutting machine has sharpening means disposed on opposite sides of the knife to sharpen the opposite sides of the knife. The machine also has means to move the sharpening means on one side of the knife into contact with the one side of the knife when the knife is removed from engagement with the material by the removal means and to move the sharpening means on the other side of the knife into contact with the other side of the knife when the knife is returned into engagement with the material being cut. Suitable means actuates the sharpening means.

This invention also relates to a material cutting machine having a rotatably mounted reciprocating knife to cut material and means to change the axis of rotation of the knife to cause the knife to be rotatable about two different axes of rotation. The cutting machine has sharpening means disposed on opposite sides of the knife to sharpen the opposite sides of the knife and means to support the sharpening means. The support means is rotatable with the knife to maintain the sharpening means angularly aligned with the knife with the support means being rotatable about a single axis of rotation. Means produce relative vertical movement between the knife and the sharpening means. The cutting machine has means to first move the sharpening means on one side of the knife into contact with the one side of the knife to sharpen the one side of the knife when relative vertical movement occurs between the knife and the sharpening means and to move the sharpening means on the other side of the knife into contact with the other side of the knife to sharpen the other side of the knife when relative vertical movement occurs between the knife and the sharpening means after the one side of the knife has been sharpened. The sharpening means is actuated by suitable means.

This invention further relates to a material cutting machine having a reciprocating knife to cut material and sharpening means disposed on opposite sides of the knife to sharpen the opposite sides of the knife. Means produce relative vertical movement between the knife and the sharpening means. The cutting machine has means to move the sharpening means on one side of the knife into contact with the one the side of the knife to sharpen the one side of the knife when relative vertical movement occurs between the knife and the sharpening means and to move the sharpening means on the other side of the knife into contact with the other side of the knife to sharpen the other side of the knife when relative vertical movement occurs between the knife and the sharpening means after the one side of the knife has been sharpened. Suitable means actuates the sharpening means. The moving means for the sharpening means includes means to compensate for wear of the knife and the sharpening means.

The attached drawings illustrated a preferred embodiment of the invention, in which.

Figure 1:
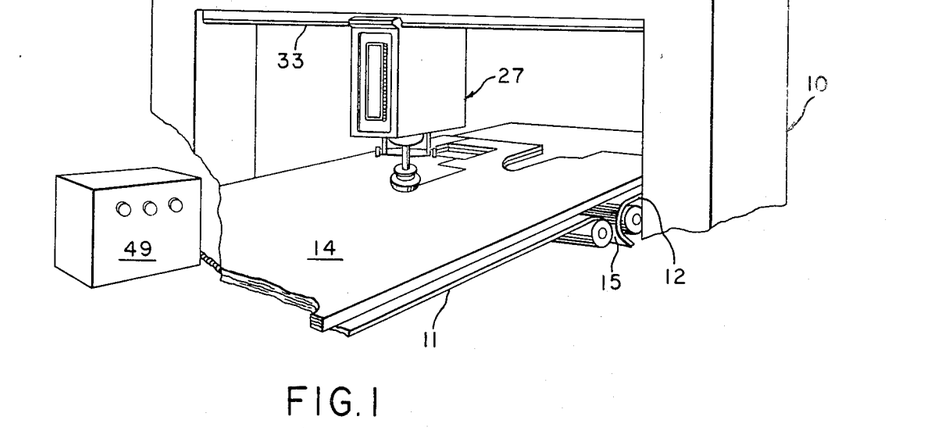
FIGURE 1 is a perspective view of a portion of a material cutting machine utilizing the sharpening apparatus of the present invention.

Referring to the drawings and particularly FIGURE 1, there is shown a material cutting machine of the type more particularly shown and described in the aforesaid Bruns application. The material cutting machine includes stationary support means such as a bridge 10. A pair of endless bands or belts 11 and 12 is adapted to support material 14 thereon.

The endless bands 11 and 12, which are flexible and formed of any suitable material, are adapted to be driven in unison to move the material 14 thereon in a longitudinal direction and relative to the bridge 10. The endless bands 11 and 12 are spaced from each other to form a transverse passage or throat 15 therebetween for reception of a cutting blade or knife 16.

The cutting blade 16 has its leading edge 17 (see FIGURES 3 and 6) sharpened to a point to form a cutting surface along its entire length. The cutting blade also has an edge 18 (see FIGURE 6), which connects the bottom end of the leading edge 17 with the bottom end of its trailing edge 19 (see FIGURE 3), sharpened to a point along its entire length. Thus, the cutting blade 16 has both the leading edge 17 and the connecting edge 18 sharpened to provide cutting surfaces whereby cutting of the material 14 occurs when the connecting edge 18 is moved into engagement with the material 14. It should be understood that both the leading edge 17 and the connecting edge 18 are on both sides of the cutting blade 16.

As more particularly shown and described in the aforesaid Bruns application, the cutting blade 16 has its upper end attached through suitable connecting means to a motor 21, which causes reciprocation of the cutting blade 16 with respect to the material 14 supported on the endless bands 11 and 12 to cut the material 14. Thus, as the motor 21 rotates, the cutting blade 16 is reciprocated.

The motor 21 is fixedly secured to an upper portion 22 of a vertically movable frame 23 for support thereby. The frame 23 is slidably supported on a plurality of rods 24 (one shown in FIGURE 2), which extend between an upper plate or disc 25 and a grinding wheel support frame 30.

The upper plate 25 forms the top wall of a housing 27 within which the motor 21 and the connecting means between the cutting blade 16 and the motor 21 are disposed. A lower plate 26 is fixedly secured to front wall 28 of the housing 27 and to the grinding wheel support frame 30.

The upper end of each of the rods 24 is permanently secured to the upper plate 25 through being pinned to a bushing 29, which is welded to the plate 25. The lower end of each of the rods 24 is permanently secured to the grinding wheel frame 30 by a pin. Thus, the grinding wheel frame 30 is fixedly secured to the upper plate 25 and supported thereby through the rods 24 being permanently secured to the upper plate 25 and the grinding wheel frame 30.

Figure 2:
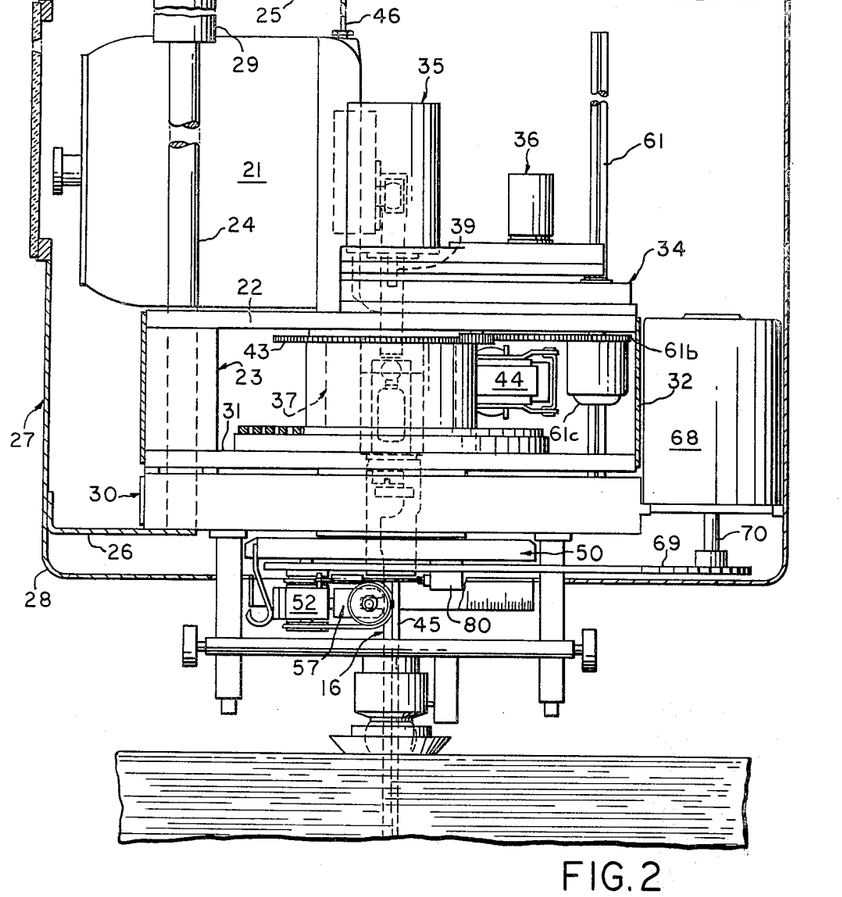
FIGURE 2 is a side elevational view, partly in section, of a portion of the material cutting machine of FIGURE 1 including the sharpening apparatus with some parts omitted for clarity purposes.

As shown in FIGURE 2, the upper portion 22 and a lower portion 31 of the frame 23 are connected to each other by a thin, continuous member 32. The member 32 extends from the upper portion 22 to almost the bottom of the lower portion 31 to make the frame 23 unitary.

As more particularly shown and described in the aforesaid Bruns application, the upper plate 25 is slidably supported on cylindrical ways 33 (see FIGURE 1). This permits the cutting blade 16 to be moved transversely through the passage 15 as more particularly shown and described in the aforesaid Bruns application.

The vertically movable frame 23 has a gear box 34 fixedly disposed on the upper surface of the upper portion 22 of the frame 23 for vertical movement therewith. The gear box 34 fixedly supports a motor 35 and a feedback resolver 36 on its upper surface.

A rotary box 37 is rotatably supported between the upper portion 22 and the lower portion 31 of the vertically movable frame 23. The rotary box 37 is adapted to be rotated by the motor 35.

Figures 5, 8:
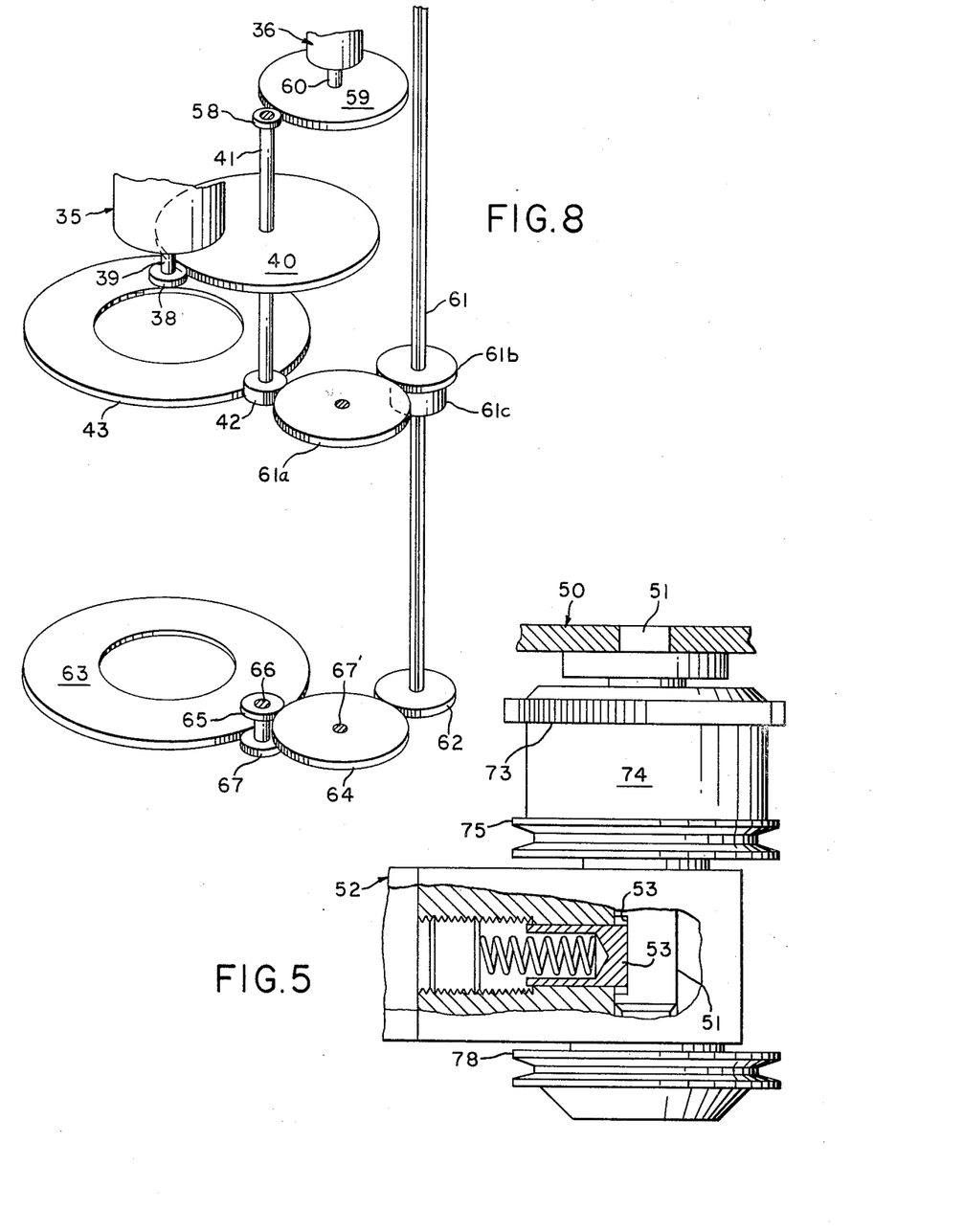
FIGURE 5 is a side elevational view, partly in section, of a portion of the structure of FIGURE 3.
FIGURE 8 is a schematic perspective view showing the gearing relation between various portions of the material cutting machine including the sharpening apparatus of the present invention.

The drive from the motor 35 to the rotary box 37 is through a pinion gear 38 (see FIGURE 8) on shaft 39 of the motor 35 meshing with a pinion gear 40 on a shaft 41, which is rotatably mounted within the gear box 34. The shaft 41 has a second pinion gear 42 meshing with a bull gear 43, which is fixedly secured to the rotary box 37. Accordingly, whenever the motor 35 is energized, the rotary box 37 is rotated.

As more particularly shown and described in the aforesaid Bruns application, the rotary box 37 has a guide member therein that is movable by a solenoid 44. As more particularly shown and described in the aforesaid Bruns application, energization of the solenoid 44 moves the cutting blade 16 from the axis of rotation (solid line position of the cutting blade 16 in FIGURE 3) about which it cuts the material 14 to another axis of rotation (dashed line position of the cutting blade 16 in FIGURE 3), which is the axis of a stiffening or guide rod 45. The stiffening or guide rod 45 has a slot to receive the trailing edge 19 of the cutting blade 16. Thus, the cutting blade 16 may reciprocate relative to the stiffening rod 45 while the stiffening rod 45 rotates with the cutting blade 16.

As more particularly shown and described in the aforesaid Bruns application, the stiffening rod 45 also is supported for lateral movement by the energization of a solenoid. This insures that the stiffening rod 45 is moved with the cutting blade 16 whenever the cutting blade 16 is moved due to energization or de-energization of the solenoid 44.

As previously mentioned, the frame 23, which carries the reciprocating motor 21 of the cutting blade 16 thereon, is slidably mounted on the rods 24. The frame 23 and the structure supported thereby are adapted to be moved upwardly from the position of FIGURE 2 through actuation of a cable 46.

As shown in FIGURE 2, one end of the cable is attached to the motor 21. Accordingly, when the cable 46 is pulled upwardly, the frame 23, the motor 21, the cutting blade 16, the connecting means between the cutting blade 16 and the motor 21, the gear box 34 and related structure, and the rotary box 37 and related structure are lifted upwardly. The actuation of the cable 46 is more particularly shown and described in the aforesaid Bruns application.

The cutting blade 16 must have the cutting edges 17 and 18 sharpened at regular intervals to maintain the edges 17 and 18 sufficiently sharpened to cut the material 14 being cut. The structure for sharpening the cutting blade 16 includes a pair of grinding wheels 47 and 48 (see FIGURE 3) disposed on opposite sides of the cutting blade 16. When the cutting blade 16 is to be sharpened, one of the grinding wheels 47 and 48 is moved into engagement with one side of each of the leading edge 17 and the connecting edge 18 of the cutting blade 16 during upward movement of the cutting blade 16, and the other of the grinding wheels 47 and 48 is moved into engagement with the other side of the leading edge 17 and the connecting edge 18 of the cutting blade 16 when the cutting blade 16 is returned to cutting engagement with the material 14.

In order to sharpen the entire length of the cutting blade 16, it is necessary to lift the cutting blade 16 a greater distance from the material 14 than is normally required when lifting the cutting blade 16 to form a sharp corner or notch in the material 14 being cut. Thus, it is necessary to render a switch (not shown), which limits the lifting of the cutting blade 16 when sharpening is not preformed, inactive when the cutting blade 16 is to be sharpened by the grinding wheels 47 and 48.

Of course, the sharpening of the cutting blade 16 occurs when the cutting blade 16 is removed from the material 14 so as to form a sharp corner or notch in the material 14. However, the height to which the cutting 16 is lifted is much greater.

Since the entire pattern cut in the material 14 by the cutting blade 16 is controlled by a numerical control apparatus 49 (see FIGURE 1), the instances when the cutting blade 16 must be lifted to a greater height than that required for merely notching or forming a sharp corner in the material 14 are programmed into the numerical contol apparatus 49.

It should be understood that the specific pattern to be cut in the material is provided as an input to the numerical control apparatus 49. This input controls the output of the numerical control apparatus 49 in the well-known manner to produce the desired movements to cut the desired pattern in the material 14. Thus, the input to the numerical control apparatus 49 is such that when sharpening of the cutting blade 16 is to occur, the numerical control apparatus 49 causes a greater lifting of the cutting blade 16 than is normally produced when the cutting blade 16 is lifted to form a notch or sharp corner in the material 14.

Of course, the input to the numerical control apparatus 49 also determines when it is necessary to lift the cutting blade 16 from the material 14 to turn the cutting blade 16 with respect to its previous heading. Thus, when a small angle is to be cut in the material 14, the input to the numerical control apparatus 49 is such that rotation of the cutting blade 16 occurs about its cutting axis without the cutting blade being lifted from cutting engagement with the material 14.

To maintain the grinding wheels 47 and 48 always properly positioned with respect to the cutting blade 16, it is necessary for the support structure for the grinding wheels 47 and 48 to be rotated with the cutting blade 16 to maintain the desired angular relationship between the grinding wheels 47 and 48 and the cutting blade 16. Accordingly, the grinding wheels 47 and 48 are supported on a rotary plate 50 (see FIGURE 6), which is rotatably mounted on the fixed grinding wheel frame 30.

The rotary plate 50 has an orbiting stud 51 (see FIGURES 3, 5, and 6) fixed thereto for rotation therewith and extending downwardly therefrom. The orbiting stud 51 carries a grinding wheel support frame 52 thereon for rotation therewith. A spring loaded detent 53 (see FIGURES 3 and 5) on the frame 52 cooperates with a flat portion 53' (see FIGURE 5) of the stud 51 to hold the frame 52 in the position of FIGURE 3 in which the grinding wheels 47 and 48 are spaced from the cutting blade 16.

The grinding wheel 47 is fixedly supported on a spindle 54, which is rotatably mounted in a bifurcated support 55 extending from the support frame 52. The grinding wheel 48 is fixedly supported on a spindle 56, which is rotatably mounted in a bifurcated support 57 extending from the grinding wheel support frame 52. Thus, the grinding wheels 47 and 48 rotate with the orbiting stud 51 and the rotary plate 50.

The rotary plate 50 is rotated by the motor 35, which also rotates the cutting blade 16. Accordingly, the rotary plate 50 is rotated the same amount as the cutting blade 16 whereby the grinding wheels 47 and 48 maintain their desired angular relationship of FIGURE 3 to the cutting blade 16 during any rotation of the cutting blade 16.

Furthermore, the motor 35 is connected through the gear train to the resolver 36. This drive to the resolver 36 from the motor 35 is through the pinion gears 38 and 40 to the shaft 41, which also has a pinion gear 58 (see FIGURE 8) thereon in addition to the pinion gears 40 and 42. The pinion gear 58 meshes with a pinion gear 59, which is mounted on shaft 60 of the resolver 36. Thus, the resolver 36 provides an electrical feedback to the numerical control apparatus 49 to indicate the amount of rotation produced by the motor 35 .

Since the rotary plate 50 is rotatably mounted on the non-rotating grinding wheel frame 30, which does not move vertically, a ball spline 61 is rotatably mounted in the frame 30 and is driven by the pinion gear 42 through an idler gear 61a and a gear 61b on a ball spline driver 61c, which slides vertically on the ball spline 61. This permits the pinion gear 42 to move vertically relative to the spline 61 while still rotating the spline 61. It should be understood that both the gears 61a and 61b are rotatably supported by the gear box 34 and move therewith too.

The lower end of the spline 61 has a pinion gear 62 fixedly attached thereto. The pinion gear 62 drives a bull gear 63, which is fixedly secured to the rotary plate 50, through an idler gear 64, a pinion gear 65, a shaft 66, and a pinion gear 67. The gear 64 is fixedly secured to a shaft 67', which is rotatably mounted in the grinding wheel frame 30, and the pinion gear 65 is fixedly connected to the shaft 66, which also is rotatably mounted in the grinding wheel frame 30. The shaft 66 also has the pinion gear 67, which meshes with the bull gear 63, mounted thereon. Accordingly, energization of the motor 35 not only causes rotation of the cutting blade 16 but also rotates the rotary plate 50 whereby the grinding wheels 47 and 48 maintain their desired angular relation of FIGURE 3 to the cutting blade 16.

When the grinding wheels 47 and 48 are to engage the cutting blade 16 to sharpen the cutting blade 16, it is necessary to rotate the grinding wheels 47 and 48 to produce the sharpening of the blade 16. The grinding wheels 47 and 48 are driven by a motor 68, which is supported within the housing 27 on the grinding wheel frame 30. The motor 68 is energized only when the grinding wheels 47 and 48 are to sharpen the cutting blade 16.

Figure 6:
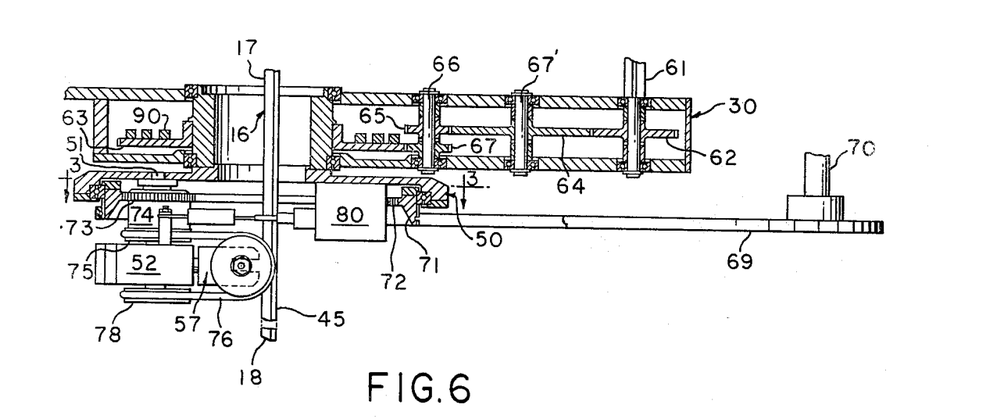
FIGURE 6 is a sectional view of a portion of the sharpening apparatus and showing means for rotating the sharpening apparatus with the knife.

A timing belt 69 (see FIGURES 2 and 6) extends between a geared pulley on shaft 70 of the motor 68 and a geared pulley on an annular member 71 (see FIGURE 6). The annular member 71, which is rotatably mounted in the rotary plate 50, has an internal gear 72, which meshes with an external gear 73 on a cylindrical member 74. The cylindrical member 74, which preferably has the gear 73 formed integral therewith, is rotatably mounted on the orbiting stud 51 so as to be carried thereby for rotation therewith but also rotatable relative to the stud 51. Accordingly, whenever the motor 68 is energized, the cylindrical member 74 is rotated.

The cylindrical member 74 has a drive pulley 75 (see FIGURE 5) mounted thereon beneath the external gear 73 by being formed integral with the member 74. A belt 76 (see FIGURES 3, 4, and 6) passes around the drive pulley 75, a pulley 77 (see FIGURE 3), which is fixed to the spindle 54, an idler pulley 78, which is rotatably mounted on the orbiting stud 51 beneath the grinding wheel support frame 52, and a pulley 79 (see FIGURE 3) fixed to the spindle 56. Thus, the belt 76 transmits the rotation from the drive pulley 75 to the grinding wheels 47 and 48 to simultaneously rotate them in opposite directions. Accordingly, energization of the motor 68 results in rotation of the grinding wheels 47 and 48. Energization of the motor 68 is controlled by the numerical control apparatus 49.

Figure 3:
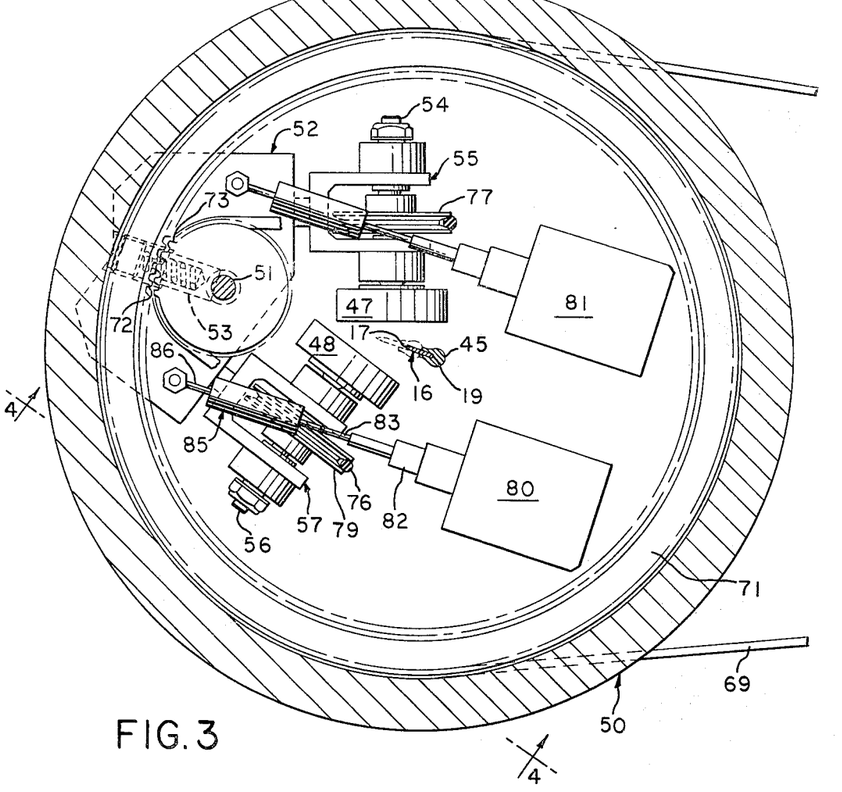
FIGURE 3 is a top plan view, partly in section, of the sharpening apparatus of the present invention and taken along line 3—3 of FIGURE 6.

As previously mentioned, the detent 53 retains the grinding wheel support frame 52 in the position of FIGURE 3 so that the grinding wheels 47 and 48 do not engage the cutting blade 16. Thus, when sharpening of the cutting blade 16 is desired, it is necessary to move the frame 52 by overcoming the detent 53 to rotate the frame 52 relative to the axis of the orbiting stud 51. Of course, the frame 52 still rotates with the stud 51 when the stud 51 is rotated with the rotary plate 50.

A solenoid 80 is connected to one end of the grinding wheel support frame 52 and a solenoid 81 is connected to the other end of the grinding wheel support frame 52. Thus, energization of the solenoid 81 causes the frame 52 to rotate clockwise (as viewed in FIGURE 3) about the axis of the orbiting stud 51 while energization of the solenoid 80 causes counterclockwise (as viewed in FIGURE 3) rotation of the frame 52 about the axis of the orbiting stud 51. The solenoids 80 and 81 are supported by the rotary plate 50 and rotate therewith.

Figure 4:
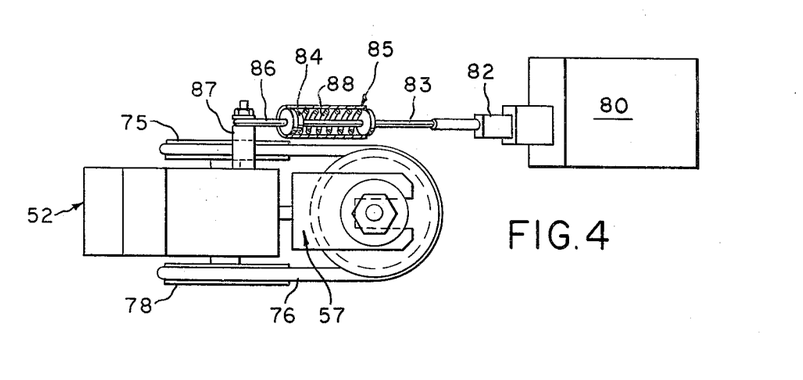
FIGURE 4 is a side elevational view, partly in section, of a portion of the structure of FIGURE 3 taken along line 4—4 of FIGURE 3 and showing means to compensate for wear of the knife and the grinding wheels of the sharpening apparatus.

As shown in FIGURE 4, the solenoid 80 is connected to the grinding wheel support frame 52 through having its plunger 82 attached to a rod 83, which has an enlarged end 84 remote from the plunger 82. The end 84 is disposed within a cylinder 85, which has a rod 86 extending therefrom and secured to a stud 87 extending upwardly from the grinding wheel support frame 52. The cylinder 85 has a spring 88 disposed therein and acting against the enlarged end 84 of the rod 83.

Accordingly, when the plunger 82 is retracted into the solenoid 80 by energization thereof, the rod 83 is moved against the force of the spring 88 to pivot the frame 52 counterclockwise (as viewed in FIGURE 3) about the axis of the stud 51 As a result, the grinding wheel 48 is brought into engagement with the side of the cutting blade 16 adjacent thereto. A similar arrangement exists between the solenoid 81 and the frame 52 to move the grinding wheel 47 into contact with the side of the cutting blade 16 adjacent thereto.

The connection between each of the solenoids 80 and 81 and the frame 52 is such that there is compensation for wear of the cutting blade 16 and the grinding wheels 48 and 47, respectively. This compensation is provided through the spring 88.

When sharpening of the cutting blade 16 is to occur, the numerical control apparatus 49 not only causes energization of the motor 68 to produce rotation of the grinding wheels 47 and 48 but also energizes the solenoid 81 before lifting of the cutting blade 16 occurs. As a result, the grinding wheel 47 is moved into engagement with the side of the cutting blade 16 adjacent thereto to sharpen both the leading edge 17 and the connecting edge 18 as the cutting blade 16 is lifted upwardly. At this time, the cutting blade 16 is mounted for rotation about its cutting axis. As shown in FIGURE 3, the grinding wheel 47 is appropriately positioned to engage the cutting blade 16 when the cutting axis is the axis of rotation of the cutting blade 16.

The grinding wheel 47 is removed from engagement with the cutting blade 16 before the cutting blade 16 is returned into cutting engagement with the material 14. It is necessary to energize the solenoid 80 and de-energize the solenoid 81 before downward movement of the cutting blade 16 occurs. Thus, when the cutting blade 16 moves downwardly, the grinding wheel 48 is disposed for engagement with the side of the cutting blade 16 adjacent thereto. At this time, the cutting blade 16 is positioned to rotate about the axis of the stiffening rod 45 and the grinding wheel 48 is appropriately located to engage the sides of the leading edge 17 and the connecting edge 18 of the cutting blade 16 during downward movement of the cutting blade 16.

It should be understood that the grinding wheel support frame 52 rotates with the stud 51 as the stud 51 rotates with the rotary plate 50 during rotation of the cutting blade 16 to form a notch or a sharp angle with respect to the previous cut formed in the material 14. This occurs even though the frame 52 has been pivoted with respect to the orbiting stud 51 by energization of one of the solenoids 80 and 81.

When the cutting blade 16 has returned into cutting engagement with the material 14, the solenoid 80 is de-energized whereby the frame 52 returns to the position in which the grinding wheels 47 and 48 are spaced from the cutting blade 16. At the same time, the motor 68 is de-energized to stop rotation of the grinding wheels 47 and 48.

Considering the operation of the present invention, sharpening of the cutting blade 16 occurs during one of the times when the cutting blade 16 is lifted out of cutting engagement with the material 14. When sharpening is to occur, the switch (not shown), which normally supplies a signal to the numerical control apparatus 49 for stopping lifting of the motor 21 as more particularly shown and described in the aforesaid Bruns application, is rendered inactive. As a result, the cutting blade 16 is lifted to a desired maximum height whereby the leading edge 17 and the connecting edge 18 may be sharpened by the grinding wheels 47 and 48.

As previously mentioned, the grinding wheel 47 is effective to sharpen the cutting blade 16 when the cutting blade 16 is moved upwardly since the cutting blade 16 has the cutting axis as its axis of rotation. The grinding wheel 48 is utilized to sharpen the cutting blade 16 during the downward movement of the cutting blade 16 when the cutting blade 16 is rotated about the axis of the stiffening rod 45. Accordingly, no down time of the material cutting machine of the present invention is required for sharpening the cutting blade 16. Instead, it is only necessary to raise the cutting blade 16 higher than in most cycles of raising and lowering. The numerical control apparatus 49 controls energization of the motor 68 and the solenoids 80 and 81 to insure proper correlation between the grinding wheels 47 and 48 and the cutting blade 16.

Figure 7:
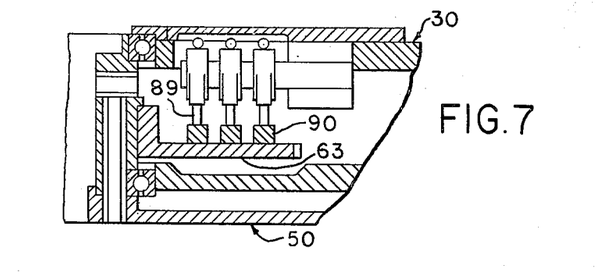
FIGURE 7 is a sectional view of a portion of the grinding wheel frame taken at a different position than FIGURE 6.

The electric supply to the solenoids 80 and 81 is supplied through three brushes 89 (see FIGURE 7) on the grinding wheel frame 30 cooperating with three slip rings 90, which are mounted on the bull gear 63 of the rotary plate 50. Thus, electrical current is always available for the solenoids 80 and 81.

While the present invention has been particularly shown and described for use with a material cutting machine having two axes of rotation as more particularly shown and described in the aforesaid Bruns application, it should be understood that the grinding wheel structure of the present invention may be utilized with a cutting blade that has only a single axis of rotation rather than two axes of rotation. One such type of material cutting machine having a single axis of rotation is shown and described in the copending patent application of George W. Sederberg for "Material Cutting Machine Having Reciprocating Cutting Blade Adapted To Enter Material Without an Entrance Cut," Ser. No. 726,657, filed May 6, 1968, and assigned to the same assignee as the present application.

When using the sharpening apparatus of the present invention with the material cutting machine of the aforesaid Sederberg application, it is only necessary to position the grinding wheels 47 and 48 on the grinding wheel support frame 52 so that each will contact one side of the cutting blade 16 when moved into engagement therewith through pivoting of the frame 52 about the axis of the stud 51.

An advantage of this invention is that the cutting blade is automatically sharpened when needed. Another advantage of this invention is that alignment between the cutting blade and the sharpening means is always maintained. A further advantage of this invention is that it permits longer utilization of the cutting blade by automatically compensating for wear of the cutting blade.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A material cutting machine comprising:
a reciprocating knife to cut material;
means to remove said knife from engagement with the material being cut;
sharpening means disposed on opposite sides of said knife to sharpen the opposite sides of said knife;
means to move said sharpening means on one side of said knife into contact with said one side of said knife when said knife is removed from engagement with the material by said removal means and to move said sharpening means on the other side of said knife into contact with said other side of said knife when said knife is returned into engagement with the material being cut;
and means to actuate said sharpening means.

2. The material cutting machine according to claim 1 in which said moving means for said sharpening means has means to compensate for wear of said knife and said sharpening means.

3. The material cutting machine according to claim 1 including:
said knife being rotatably mounted;
and means to support said sharpening means and rotatable with said knife to maintain said sharpening means angularly aligned with said knife.

4. The material cutting machine according to claim 3 including:
means to change the axis of rotation of said knife after said knife is removed by said removal means from engagement with the material being cut;
and said support means being rotatable about a single axis of rotation.

5. The material cutting machine according to claim 3 in which:
said sharpening means comprises two separate grinding wheels disposed on opposite sides of said knife;
said support means includes:
an orbiting stud rotatable with said knife;
means mounted on said stud for rotation therewith;
means to rotatably support each of said grinding wheels on said stud mounted means;
and means to normally hold said stud mounted means in a position in which each of said grinding wheels is retained in spaced relation to said knife;
and said moving means for said sharpening means includes means to pivot said stud mounted means to move one of said grinding wheels into contact with one side of said knife to sharpen said one side of said knife when said knife is removed from engagement with the material being cut and to move the other of said grinding wheels into contact with the other side of said knife to sharpen said other side of said knife when said knife is returned into engagement with the material being cut.

6. The material cutting machine according to claim 5 in which:
said pivot means for said stud mounted means includes:
first means attached to said stud mounted means on one side of said orbiting stud and second means attached to said stud mounted means on the other side of said orbiting stud;
and said first means pivoting said stud mounted means in one direction to move said one grinding wheel into contact with said one side of said knife and said second means pivoting said stud mounted means in the opposite direction to move said other grinding wheel into contact with said other side of said knife.

7. The material cutting machine according to claim 5 in which said pivot means for said stud mounted means has means to compensate for wear of said knife and said grinding wheels.

8. The material cutting machine according to claim 6 in which said first means of said pivot means for said stud mounted means has means to compensate for wear of said one side of knife and said one grinding wheel and said second means of said pivot means for said stud mounted means has means to compensate for wear of said other side of said knife and said other grinding wheel.

9. A material cutting machine comprising:
a rotatably mounted reciprocating knife to cut material;
means to change the axis of rotation of said knife to cause said knife to be rotatable about two different axes of rotation;
sharpening means disposed on opposite sides of said knife to sharpen the opposite sides of said knife;
means to support said sharpening means, said support means being rotatable with said knife to maintain said sharpening means angularly aligned with said knife, said support means being rotatable about a single axis of rotation;
means to produce relative vertical movement between said knife and said sharpening means;
means to first move said sharpening means on one side of said knife into contact with said one side of said knife to sharpen said one side of said knife when relative vertical movement occurs between said knife and said sharpening means and to move said sharpening means on the other side of said knife into contact with said other side of said knife to sharpen said other side of said knife when relative vertical movement occurs between said knife and said sharpening means after said one side of said knife has been sharpened;

and means to actuate said sharpening means.

10. The material cutting machine according to claim 9 in which said moving means for said sharpening means has means to compensate for wear of said knife.

11. The material cutting machine according to claim 9 in which:

said sharpening means comprises two separate grinding wheels disposed on opposite sides of said knife;

said support means includes:

an orbiting stud rotatable with said knife;

means mounted on said stud for rotation therewith;

means to rotatably support each of said grinding wheels on said stud mounted means;

and means to normally hold said stud mounted means in a position in which each of said grinding wheels is retained in spaced relation to said knife;

and said moving means for said sharpening means includes means to pivot said stud mounted means to move one of said grinding wheels into contact with one side of said knife to sharpen said one side of said knife when relative vertical movement occurs between said knife and said grinding wheels and to move the other of said grinding wheels into contact with the other side of said knife to sharpen said other side of said knife when relative vertical movement occurs between said knife and said grinding wheels after said one side of said knife has been sharpened.

12. The material cutting machine according to claim 11 in which:

said pivot means for said stud mounted means includes:

first means attached to said stud mounted means on one side of said orbiting stud and second means attached to said stud mounted means on the other side of said orbiting stud;

and said first means pivoting said stud mounted means in one direction to move said one grindwheel into contact with said one side of said knife and said second means pivoting said stud mounted means in the opposite direction to move said other grinding wheel into contact with said other side of said knife.

13. The material cutting machine according to claim 11 in which said pivot means for said stud mounted means has means to compensate for wear of said knife and said grinding wheels.

14. The material cutting machine according to claim 12 in which said first means of said pivot means for said stud mounted means has means to compensate for wear of said one side of said knife and said one grinding wheel and said second means of said pivot means for stud mounted means has means to compensate for wear of said other side of said knife and said other grinding wheel.

15. A material cutting machine comprising:

a reciprocating knife to cut material;

sharpening means disposed on opposite sides of said knife to sharpen the opposite sides of said knife;

means to produce relative vertical movement between said knife and said sharpening means;

means to move said sharpening means on one side of said knife into contact with said one side of said knife to sharpen said one side of said knife when relative vertical movement occurs between said knife and said sharpening means and to move said sharpening means on the other side of said knife into contact with said other side of said knife to sharpen said other side of said knife when relative vertical movement occurs between said knife and said sharpening means after said one side of said knife has been sharpened;

means to actuate said sharpening means;

and said moving means for said sharpening means including means to compensate for wear of said knife and said sharpening means.

References Cited

UNITED STATES PATENTS 2,171,604  9/1939  Segal ____________ 30—139 X

JAMES M. MEISTER, Primary Examiner

U.S. Cl. X.R.

51—247

UNITED STATES PATENT OFFICE
CERTIFICATE OF CORRECTION

Patent No. 3,507,177　　　　　　　　　　　　　　　　　　April 21, 1970

Herman J. Baldwin

It is certified that error appears in the above identified patent and that said Letters Patent are hereby corrected as shown below:

Column 3, line 15, cancel "the", second occurrence; line 37, "6." should read -- 6; --. Column 5, line 17, after "cable" insert -- 46 --; line 49, "preformed" should read -- performed --; line 54, after "cutting" insert -- blade --. Column 7, line 70, "51" should read -- 51. --. Column 12, line 11, after "for" insert -- said --.

Signed and sealed this 29th day of December 1970.

(SEAL)
Attest:

Edward M. Fletcher, Jr.　　　　　　　　　　　WILLIAM E. SCHUYLER, JR.
Attesting Officer　　　　　　　　　　　　　　　　　Commissioner of Patents